April 19, 1927.  W. J. ANDRES  1,625,444

BRAKE MECHANISM

Filed July 25 1925  2 Sheets-Sheet 1

INVENTOR
WILLIAM J. ANDRES
BY
ATTORNEY

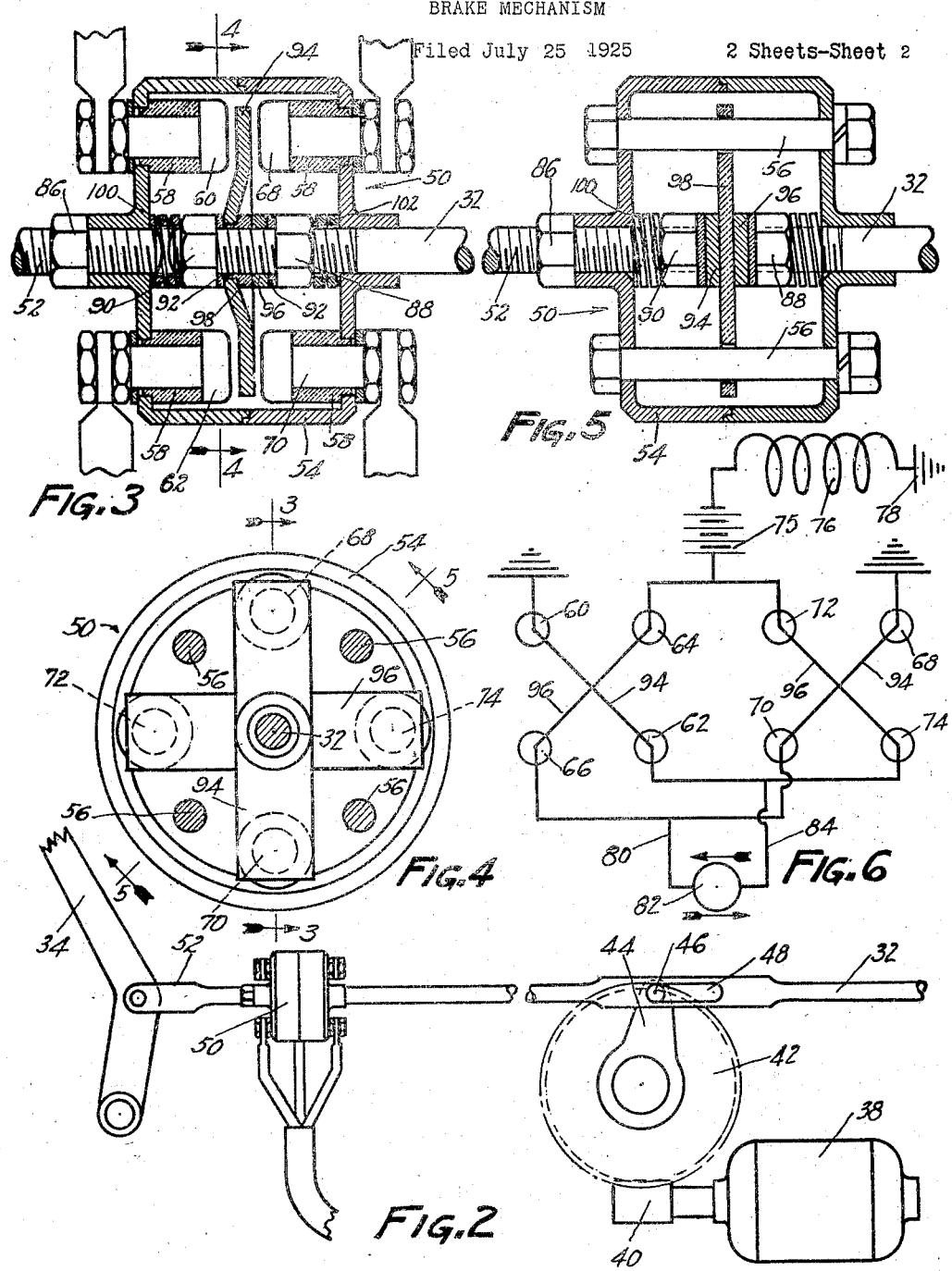

Patented Apr. 19, 1927.

1,625,444

UNITED STATES PATENT OFFICE.

WILLIAM J. ANDRES, OF SOUTH BEND, INDIANA, ASSIGNOR TO BENDIX BRAKE COMPANY, OF CHICAGO, ILLINOIS, A CORPORATION OF ILLINOIS.

BRAKE MECHANISM.

Application filed July 25, 1925. Serial No. 46,039.

This invention relates to brakes, and is illustrated as embodied in an automobile chassis. An object of the invention is to eliminate the slipping clutch of the usual constantly-operating servo mechanism, by arranging for holding the brakes on with the power cut out or balanced, the servo motor being reversible in operation.

In one arrangement, an electric motor is used as the servo motor, and is controlled by a novel reversing switch so that it first applies the brakes, preferably through substantially irreversible means shown as worm gearing, and the circuit is then automatically opened with the brakes held on by the gearing or its equivalent. Movement of the brake pedal, or other controlling member, to brake-releasing position serves to reverse the motor circuit to release the brakes, the circuit then automatically opening again.

The above and other objects and features of the invention, including various novel combinations of parts and desirable particular constructions, will be apparent from the following description of one illustrative embodiment shown in the accompanying drawing, in which:

Fig. 2 is a side elevation of the motor and adjacent parts of the operating connections;

Fig. 3 is a section vertically through the novel reversing switch;

Fig. 4 is a section through the switch on the line 4—4 of Fig. 3;

Fig. 5 is a section through the switch substantially on the line 5—5 of Fig. 4; and Fig. 6 is a wiring diagram.

Figure 1:
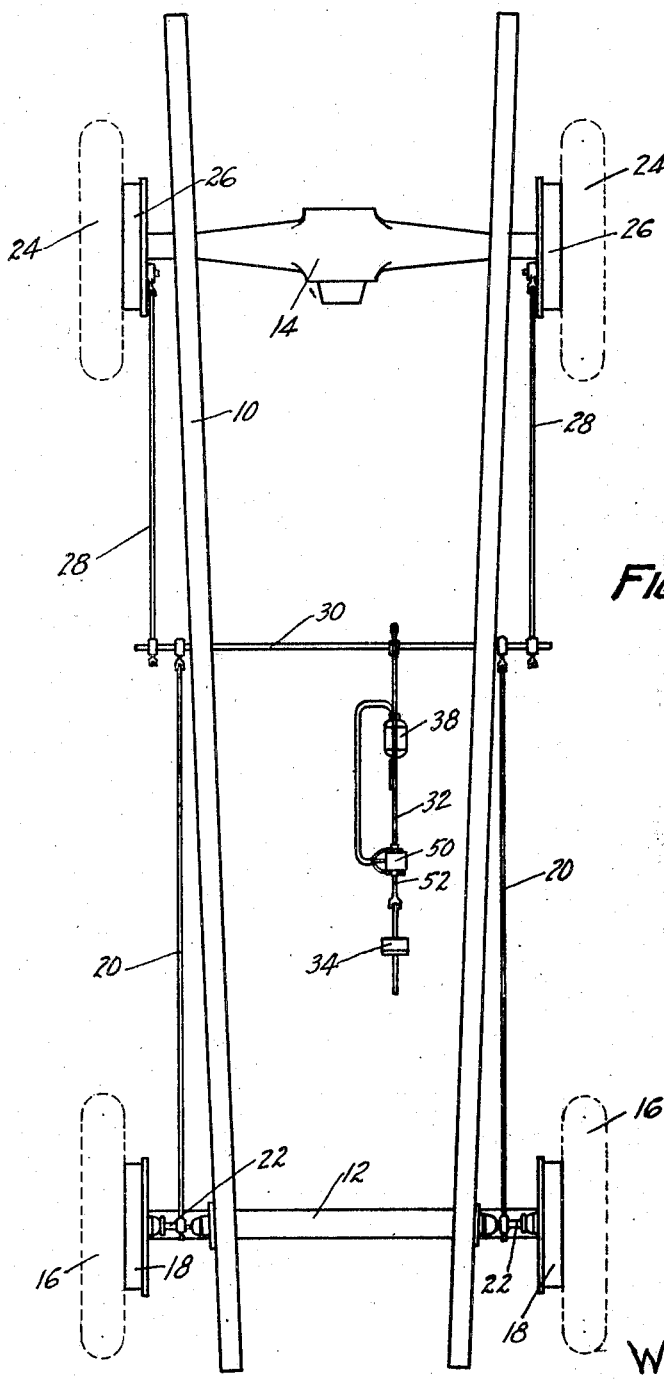
Fig. 1 is a top plan view of an automobile chassis embodying the invention.

In the arrangement selected for illustration, the invention is embodied in an automobile chassis including a frame 10 supported by the usual springs (not shown) on a front axle 12 and rear drive axle 14. The front wheels 16 have brakes 18 operated by brake rods 20 connected to Perrot controls 22, and the rear wheels 24 have brakes 26 operated by rods 28. Rods 20 and 28 are connected to arms on a cross shaft 30 connected by a brake rod 32 to the service pedal 34, or to some equivalent controlling member. Except as further described below, the above-listed parts or their equivalents may be of any desired construction.

The power device or servo motor is shown as an electric motor 38, preferably operating through irreversible gearing illustrated as a worm 40 on the armature shaft and driving a worm wheel 42 connected to an arm 44 having a pin or roller 46 projecting into a slot 48 in the brake rod 32. Slot 48 is long enough so that the projection 46 does not interfere with applying the brakes manually in case the motor cannot be operated.

The novel reversing switch is indicated at 50, and is interposed between the brake rod 32 and a short continuation rod 52 connected to pedal 34 or other controlling member. It includes a casing 54, made in two parts held together by bolts 56, and formed with openings for insulating bushings 58 carrying four left contacts 60, 62, 64, and 66, and four right contacts 68, 70, 72, and 74. As shown in Fig. 6, contacts 60 and 68 are grounded, contacts 64 and 72 are connected to each other and through battery 75 and field 76 of motor 38 to ground at 78, contacts 66 and 70 are connected to one lead 80 of armature 82 of the motor, and contacts 62 and 74 are connected to the other lead 84 of the armature.

As appears in Fig. 3, the continuation brake rod 52 from pedal 34 may be threaded into the left wall of the casing 54 and held by a locknut 86. Rod 32 is slidably received in a perforated boss on the right wall of the casing, and has on its end inside the casing two nuts 88 and 90 clamping between them insulating washers 92 and a pair of crossed contact-bridging members 94 and 96 separated by an insulating plate 98 guided on bolts 56 (Fig. 5). A spring 100 is confined between nut 90 and the left wall of casing 54 and a spring 102 is confined between nut 88 and the right wall. Normally these two springs 100 and 102 hold the contact-bridging device 96—98 in central neutral position, with the field and armature circuits both open. No matter which set of contacts is bridged by device 94—96, the field current is in the same direction, flowing through a circuit including the battery 74 and the field 76 and grounded at 78 at one end and connected to contacts 64 and 72 at the other end (see Fig. 6).

In operation, depression of pedal 34 pulls on casing 54 to compress spring 102 and cause member 94 to bridge contacts 68 and 70, and member 96 to bridge contacts 72 and 74. The circuit now includes the battery grounded through field 76, member 96, contact 74, lead 84, armature 82, lead 80, contact 70, member 94, and contact 68, which is grounded. This causes operation of the motor 38 in a direction to swing projection 46 to the left (Fig. 2) to apply the brakes. When the brakes are applied in an amount which is a function of the angular position of pedal 34, projection 46 has moved rod 32 to the left far enough to permit spring 102 to open the circuit. With the circuit open, worm gearing 40—42, which is substantially irreversible, holds the brakes applied without any expenditure of current.

If pedal 34 is depressed further, the above cycle is repeated, additional pressure being applied to the brakes. If, however, the pedal is entirely released, projection 46 holds the members 94 and 96 stationary, while the pedal-returning spring (not shown), which is much stronger than the small springs 100 and 102, moves casing 54 in a direction to compress spring 100, bridging the left-hand contacts. The circuit now includes the field and battery, contact 64, member 96, contact 66, lead 80, armature 82, lead 84, contact 62, member 94, and contact 60, which is grounded. It will be seen that this reverses the armature current, and, since the field current is not reversed the motor is reversed to swing projection 46 to the right to release the brakes. When the brakes are released, springs 100 and 102 again balance, with the motor circuit open.

If pedal 34 is not entirely released, but only let part way up, the circuit will open as described while gearing 40—42 still maintains a pressure on the brakes which is a function of the new angular position of the pedal—i. e. the pressure is reduced in an amount corresponding to the amount the pedal is moved upwardly.

While one illustrative embodiment of the invention has been described in detail, it is not my intention to limit its scope to that particular embodiment, or otherwise than by the terms of the appended claims. While of use in many other connections, the invention is highly advantageous in operating the brakes of heavy automobile busses.

I claim:

1. A vehicle having, in combination, brakes, a power device, a brake-controlling member, and connections from said member to the brakes including a controller for said device constructed and arranged to be operated by movement of said member in one direction to cause the power device to apply the brakes in an amount determined by the extent of movement of the controller and to be operated by movement of said member in the opposite direction to reverse the operation of said power device.

2. A vehicle having, in combination, brakes, a power device, a brake-controlling member, and connections from said member including a controller for said device constructed and arranged to be operated by movement of said member in one direction to cause the power device to apply the brakes in an amount determined by the extent of movement of said member and then to hold them applied and to be operated by movement of said member in the opposite direction to reverse the operation of said power device to release the brakes.

3. A vehicle having, in combination, brakes, a motor, a brake-controlling member, connections from said member to operate the motor in opposite directions when said member is moved in opposite directions, to apply and release the brakes, and auxiliary brake connections including as a tension element a motor-controlling device.

4. A vehicle having, in combination, brakes, a motor, a brake-controlling member, and mechanical connections from said member to the brakes including as an element a controller arranged to operate the motor in opposite directions when said member is moved in opposite directions, to apply and release the brakes.

5. Braking mechanism comprising, in combination, brakes, an electric motor, connections from the motor to the brakes, a brake-controlling member, and a switch operated by movement of said member in one direction to close a circuit through the motor in one direction to apply the brakes variably through said connections with a pressure determined by the extent of movement of said member, said switch being operated by movement of the member in the opposite direction to reverse the motor circuit to release the brakes.

6. Braking mechanism comprising, in combination, brakes, an electric motor, connections from the motor to the brakes, a brake-controlling member, and a switch operated by movement of said member in one direction to close a circuit through the motor in a direction to cause it to turn in a direction to apply the brakes through said connections and then automatically to open the circuit and hold the brakes applied with a pressure determined by the extent of movement of said member, said switch being operated by movement of the member in the opposite direction to reverse the motor circuit to release the brakes and then automatically to open the circuit.

7. Braking mechanism comprising, in combination, brakes, an electric motor, connections from the motor to the brakes, an operating member having a lost-motion connection to the brakes to operate them manually when the motor is not operative, and a switch operated by said operating member during said lost motion and arranged to close a circuit through the motor to cause it to apply the brakes when said member is moved in a brake-applying direction and to reverse the circuit to release the brakes when said member is moved in a brake-releasing direction.

8. Braking mechanism comprising, in combination, brakes, an electric motor, connections from the motor to the brakes, an operating member having a lost-motion connection to the brakes to operate them manually when the motor is not operative, and a reversing switch embodied in said lost-motion connection and operated by said operating member during said lost motion and arranged to close a circuit through the motor to cause it to apply the brakes when said member is moved in a brake-applying direction and to reverse the circuit to release the brakes and then automatically to open the circuit when said member is moved in a brake-releasing direction.

9. Braking mechanism comprising, in combination, brakes, a power device, and brake-applying connections operable either by the power device or manually and including a device controlling the operation of the power device and operated by tension on the connections.

10. Braking mechanism comprising, in combination, brakes, a motor, and brake-applying connections operable either by the motor or manually and including a switch controlling the operation of the motor and operated by tension on the connections.

11. Braking mechanism comprising, in combination, brakes, a motor, a controlling member, connections from the motor and controlling member to the brakes, and a motor-controlling device embodied in the connections from the controlling member and actuated to operate the motor in one direction or the reverse according to whether the tension on said member is from or toward the brakes, to cause the motor to apply and release the brakes.

12. Braking mechanism comprising, in combination, brakes, an electric motor, a controlling member, connections from the motor and controlling member to the brakes, and a motor-controlling reversing switch embodied in the connections from the controlling member and actuated to close the circuit of the motor in one direction or the reverse according to whether the tension on said switch is from or toward the brakes, to cause the motor to apply and release the brakes.

13. Braking mechanism comprising, in combination, brakes, a power motor, connections from the motor to the brakes, a controlling member, and a motor-controlling device including spring means distorted in one direction by the pressure on the controlling member and distorted in the opposite sense by pressure on the brakes, said device being arranged to be actuated by distortion of the spring means by brake-applying movement of the controlling member to operate the motor to apply the brakes causing distortion of the spring means in the opposite sense to cut out the motor when the pressures balance, leaving the brakes applied, and the spring means being distorted when the controlling member is moved in brake-releasing direction to operate the motor in brake-releasing direction and then to balance and cut out the motor when the brakes are released.

14. Braking mechanism comprising, in combination, brakes, an electric motor, connections from the motor to the brakes, a controlling member, a reversing switch including spring means distorted in one direction by pressure on the controlling member and distorted in the opposite sense by pressure on the brakes, said switch being arranged to be actuated by distortion of the spring means by brake-applying movement of the controlling member to close the motor circuit to apply the brakes, such application of the brakes causing distortion of the spring means in the opposite sense to open the motor circuit when the pressures balance, leaving the brakes applied, and the spring means being distorted when the controlling member is moved in brake-releasing direction to close the motor circuit in the reverse direction and then to balance and open the motor circuit when the brakes are released.

In testimony whereof I have hereunto signed my name.

WILLIAM J. ANDRES.